United States Patent [19]

Shinoda

[11] Patent Number: 5,007,849

[45] Date of Patent: Apr. 16, 1991

[54] SIGNAL LINE CONNECTING STRUCTURE FOR A KEYBOARD OF ELECTRONIC APPARATUS

[75] Inventor: Akira Shinoda, Ohbu, Japan

[73] Assignee: Brother Kogyo Kabushiki Kaisha, Japan

[21] Appl. No.: 471,890

[22] Filed: Jan. 29, 1990

[30] Foreign Application Priority Data

Mar. 27, 1989 [JP] Japan .............................. 1-34415[U]

[51] Int. Cl.$^5$ ............................................ H01R 35/00
[52] U.S. Cl. .................................... 439/165; 364/708; 361/398
[58] Field of Search ................. 439/67, 162, 164, 165, 439/493, 499; 361/390, 391, 395, 398, 415; 364/708, 223; 16/223

[56] References Cited

U.S. PATENT DOCUMENTS

| | | | |
|---|---|---|---|
| 4,496,643 | 1/1985 | Greenblatt | 364/708 |
| 4,497,036 | 1/1985 | Dunn | 364/708 |
| 4,688,020 | 8/1987 | Kuehneman et al. | 340/365 UL |
| 4,825,395 | 4/1989 | Kinser, Jr. et al. | 364/708 |
| 4,842,531 | 6/1989 | Takemura | 439/165 |
| 4,852,033 | 7/1989 | Saitou | 364/708 |
| 4,939,514 | 7/1990 | Miyazalxi | 361/398 |
| 4,939,792 | 7/1990 | Urbish et al. | 361/415 |

FOREIGN PATENT DOCUMENTS

| | | |
|---|---|---|
| 273750 | 7/1988 | European Pat. Off. . |
| 160418 | 8/1985 | Japan ................................ 364/708 |

*Primary Examiner*—Gary F. Paumen
*Attorney, Agent, or Firm*—Oliff & Berridge

[57] ABSTRACT

A keyboard is hinged at the front end of the main body of an electronic apparatus. The keyboard swings around the hinge section to have a folding position in which it is raised upright against the front face of the main body and an operating position in which it is laid down in a virtually horizontal attitude. The keyboard incorporates a key switch circuit board on which a matrix of electrical contacts is formed, and the main body incorporates a main controller board for the electrical apparatus. A connecting printed circuit board is used to connect the signal lines of the key switch circuit board to the corresponding signal lines of the main controller board. The connecting printed circuit board is flexible, and is bent when the keyboard takes one of the folding position and operating position. Its bend is relaxed when the keyboard takes the other position.

10 Claims, 3 Drawing Sheets

SIGNAL LINE CONNECTING STRUCTURE FOR A KEYBOARD OF ELECTRONIC APPARATUS

BACKGROUND OF THE INVENTION

1. Field of the Invention

The present invention relates to a signal line connecting structure for a keyboard of electronic apparatus, and particularly to a structure in which the signal lines of a printed circuit board located inside the keyboard are connected through connecting printed circuit boards to the signal lines of the main controller board located inside the main body of the apparatus.

2. Description of Related Art

In a conventional portable electronic apparatus, a keyboard is hinged at its rear end to the front end of the apparatus main body. This enables the keyboard to be laid down to have a virtually horizontal attitude when the apparatus is used, or to be raised upright to the front face of the apparatus main body in a folding position when the apparatus is transported.

The keyboard is provided with a number of key switches and also provided therein with a printed circuit board having a matrix of electrical contacts arranged in multiple rows and multiple columns in correspondence to the key switches. Also provided inside the keyboard is another printed circuit board, on which are mounted a plurality of electronic component parts including a decoding ROM which stores data for converting the row and column signals produced on the printed circuit board into code data and a CPU (central processing unit) which transfers, in the form of serial data, the code data to a main controller board located inside the apparatus main body. The keyboard printed circuit board and main controller board are connected by a connection cable made up of a number of signal lines.

As described above, the conventional electronic apparatus requires a keyboard printed circuit board, on which a plurality of electronic component parts such as a decoding ROM and CPU are mounted, to be located inside the keyboard, thus requiring a connection cable for connecting the keyboard printed circuit board inside the keyboard to the main controller board inside the apparatus main body. Due to the above-described structure, the conventional apparatus suffers from a high manufacturing cost and a complex keyboard structure.

SUMMARY OF THE INVENTION

An object of the present invention is to provide a keyboard signal line connecting structure which simplifies the keyboard structure.

Another object of the present invention is to provide a keyboard signal line connecting structure which reduces the number of electronic component parts inside the keyboard so that the keyboard has improved reliability.

A further object of the present invention is to provide a keyboard signal line connecting structure which delivers the key matrix output signals without the rendering of coding.

According to the present invention, there is provided a keyboard signal line connecting structure electrically connecting a keyboard to a host apparatus comprising: a hinge member hinging the keyboard to a front face of the host apparatus so that the keyboard can be moved between a folding attitude uprightly facing against the front face of the host apparatus and a virtually horizontal laid-down attitude being operable by an operator; a key switch circuit board having a plurality of key switches arranged in a matrix in the keyboard; a main controller board which is disposed inside the host apparatus, provided with electronic component parts for controlling the host apparatus; and a flexible connecting printed circuit board for connecting a number of signal lines of the key switch circuit board to corresponding signal lines of the main controller board, extending from a key switch circuit board to the main controller board, and provided with a bend section which increases the degree of bending when the keyboard takes one of the folding attitude and the laid-down attitude, or decreases the degree of bend when it takes the other attitude.

The keyboard is permitted to swing between the folding attitude and the laid-down attitude, which is merely accompanied by a change in the degree of bend in the bend section of the connecting printed circuit board without imposing any problem for the signal transfer. Moreover, since the signal lines of the printed circuit board are connected through the connecting printed circuit board to the corresponding signal lines of the main controller board, key signals from the key switch circuit board are delivered reliably to the main controller board through the connecting printed circuit board.

The key switch circuit board and the main controller board are connected directly by the connecting printed circuit board without intervention by any other electronic component parts. The requirement of a keyboard printed circuit board having a decoding ROM, CPU, etc. and a connection cable is eliminated without sacrificing the inherent functions of the apparatus, resulting in a drastic reduction of the number of keyboard component parts and a significant enhancement of the reliability of the device. When the connecting printed circuit board is formed integrally with the key switch circuit board, further reduction of component parts such as connectors is possible.

BRIEF DESCRIPTION OF THE DRAWINGS

The invention will be described in detail with reference to the following drawings in which like reference numerals refer to like elements and wherein.

DESCRIPTION OF THE PREFERRED EMBODIMENT

Figure 1:
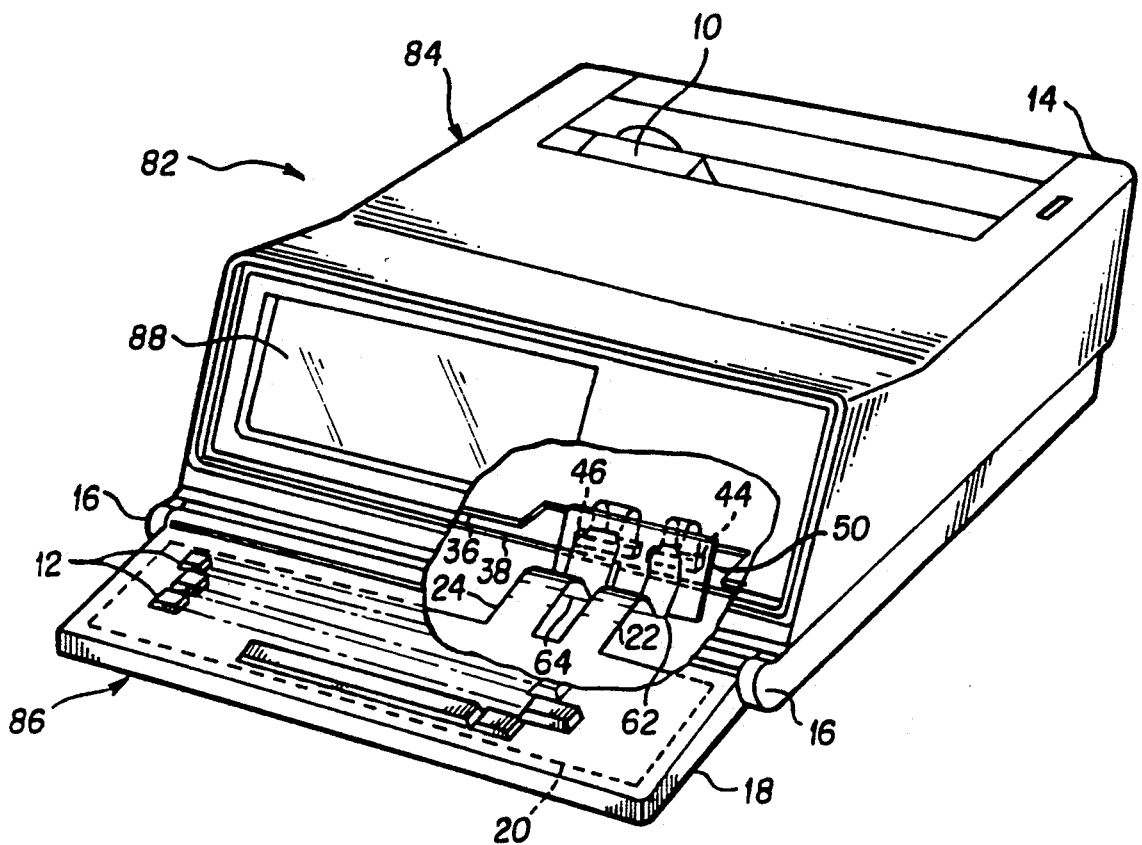
FIG. 1 is a partially cut-away perspective view of a word processor having a folding keyboard.

An embodiment of the present invention will be described with reference to the drawings. This embodiment is the application of the invention to a word processor. In FIG. 1, a word processor 82 includes a main body 84 and a keyboard 86. Included in the main body 84 are a CRT 88 for displaying characters and symbols, a daisy wheel printer 10, and a floppy disk drive unit. The keyboard 86 has character keys 12 including alphabetic keys, numeric keys and symbolic keys, and various function keys, as in the case of usual word processors. In the right and left end sections at the lower front end of the main frame 14 of the main body 84, there are formed a pair of hinges 16 protruding forward, by which the keyboard 86 is swingably supported at right and left ends of its rear end section. Accordingly, the keyboard 86 has its attitude selected between the operating position (shown by the solid line in FIGS. 1 and 4), at which it is laid down to a virtually horizontal attitude by being swung in the direction indicated by arrow A and the folding position (shown by the 2-dot and dash line in FIG. 4), at which it is raised upright to the front face of the main body 84 by being swung in the direction indicated by arrow B.

Figure 2:
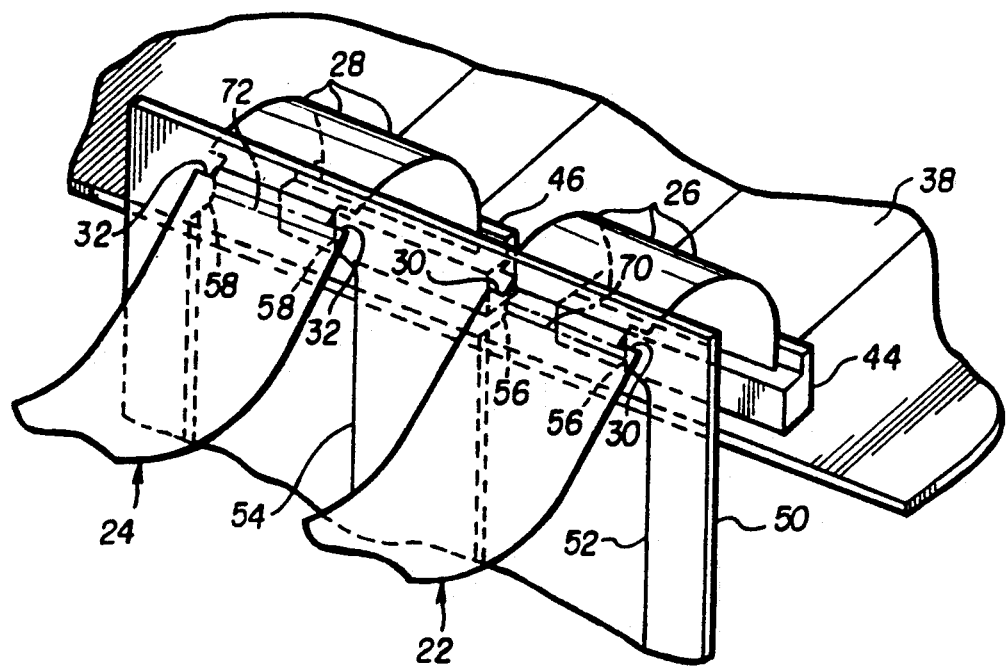
FIG. 2 is a partially enlarged perspective view of the signal line connecting structure which connects the connecting printed circuit boards to the main controller board.
Figure 3:
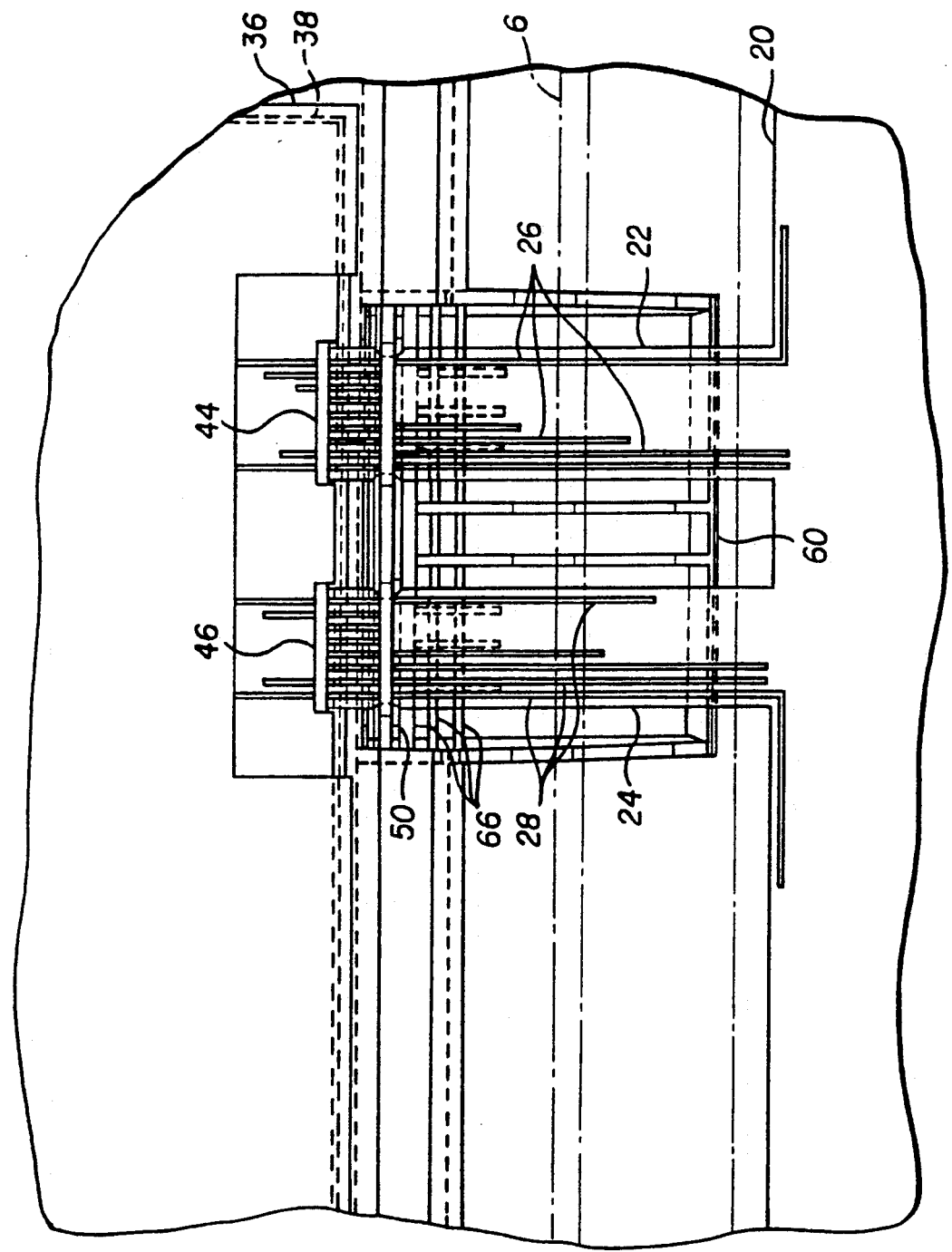
FIG. 3 is a partial plan view of the signal line connecting structure.

Provided inside the frame 18 of the keyboard 86 is a rectangular flexible printed circuit board 20 having electrical contacts in the form of a matrix of multiple rows and multiple columns in correspondence to the character keys 12 and function keys. The printed circuit board 20 is fixed at several positions to the frame 18. The printed circuit board 20 has a three-layer structure with appropriate flexibility and elasticity formed of an upper film, a lower film and a spacer of insulator placed between the upper and lower films. Many column signal lines 26 (upper electrodes) printed on the lower surface of the upper film and many row signal lines 28 (lower electrodes) printed on the upper surface of the lower film constitute a matrix of electrical contacts. A reinforcement plate of insulator is placed under the printed circuit board 20 so that it does not droop downward. As shown in FIG. 1, a pair of connecting flexible printed circuit boards 22 and 24 having a certain length are one-piece with and extend from the rear edge section of the printed circuit board 20 toward the rear end of the keyboard 86 through slits 21 (see FIG. 4) formed in the rear end of the frame 18. As shown in FIG. 3, printed on the connecting printed circuit board 22 along the entire front-to-rear length thereof are patterns of a certain number (e.g., nine) of column signal lines 26 in continuous fashion with respect to the column signal lines 26 on the printed circuit board 20. As shown in FIG. 2, the connecting printed circuit board 22 has a pair of confronting cuts (notches or recesses) 30 located a certain distance forward from its rear end at right and left edge sections thereof. Similarly, printed on the connecting printed circuit board 24 along the entire front-to-rear length thereof are patterns of a certain number (e.g., eight) of row signal lines 28 in continuous fashion with respect to the row signal lines 28 on the printed circuit board 20. The connecting printed circuit board 24 has a pair of confronting cuts 32 located a certain distance forward from its rear end at the right and left edge sections thereof.

Formed on the bottom of the main frame 14 is a recessed section 34 of a certain size, having an opening 40 covered by a mount plate 42. Accommodated in the recessed section 34 defined by the wall 36 of recess 34 and the mount plate 42 is a main controller board 38 on which several electronic component parts including a CPU, ROM and RAM for controlling the word processor 82 are mounted. The main controller board 38 is fixed at several positions to the recess wall 36. The main controller board 38 has many printed signal lines for interconnecting the electronic component parts located thereon. Among the signal lines, those corresponding to the column signal lines 26 and row signal lines 28 from the connecting printed circuit boards 22 and 24 are connected to a pair of connectors 44 and 46, respectively, fixed in the front edge section of the main controller board 38. The recess wall 36 has front end portions cut partially in correspondence to the connectors 44 and 46.

The main frame 14 has cuts at the lower end sections of the front wall 48 in positions confronting the connectors 44 and 46, and a virtually rectangular auxiliary frame plate 50 is fixed in these cuts. The auxiliary frame plate 50 has, at a portion confronting the connector 44, an opening 52 which is slightly larger in width than the connecting printed circuit board 22, and an opening 54 which is slightly larger in width than the connecting printed circuit board 24 at a portion confronting the connector 46. Formed at the upper end sections of the right and left edges of the opening 52 are a pair of lugs 56 protruding toward the interior of the opening 52 so that they mate with the pair of cuts 30 of the connecting printed circuit board 22. Similarly, formed at the upper end sections of the right and left edges of the opening 54 are a pair of lugs 58 protruding toward the interior of the opening 54 so that they mate with the pair of cuts 32 of the connecting printed circuit board 24. Furthermore, the main frame 14 has a recess 61 at its front edge section confronting the auxiliary frame plate 50, and an extended section 60 which extends forwardly from the front edge section along the rear end section of the keyboard 86 which is formed integrally with the main frame 14.

Figure 4:
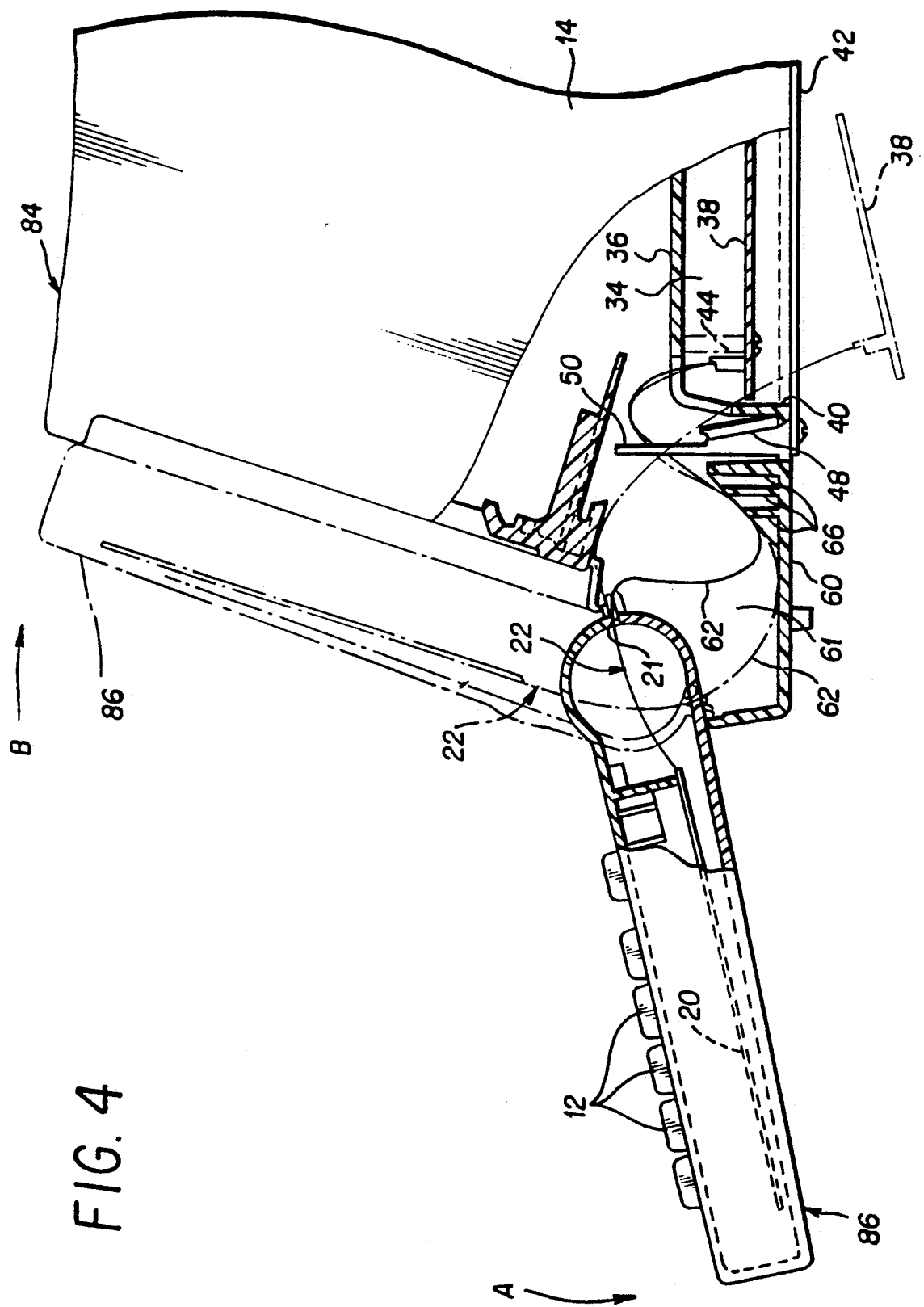
FIG. 4 is a partial cut-away side view of the signal line connecting structure.

Accordingly, when the keyboard 86 is set in the operating position as shown in FIG. 4, the connecting printed circuit board 22 extending through the slit 21 at the rear end of the keyboard 86 has a bend section 62, which encompasses about ⅔ of the entire length of connecting printed circuit board 22, bent largely downward inside the recess 61 of the extended section 60, with its pair of cuts 30 mating with the corresponding lugs 56 in auxiliary frame plate 50 and its rear edge section coupling with the connector 44. Similarly, the connecting printed circuit board 24 extending through slit 21 at the rear end of the keyboard 86 has a bend section 64 which encompasses about ⅔ of the entire length of connecting printed circuit board 24, bent largely downward inside the recess 61 of the extended section 60, with its pair of cuts 32 mating with the corresponding lugs 58 in auxiliary frame plate 50 and its rear edge section coupling with the connector 46.

Consequently, the column signal lines 26 from the connecting printed circuit board 22 and the row signal lines 28 from the connecting printed circuit board 24 are connected directly to the corresponding signal lines of the main controller board 38 through the connectors 44 and 46, respectively. The extended section 60 is provided as an integral formation at its rear end section with three guide places 66 having different heights and extending in parallel in the right-left direction. A firm coupling is maintained between the recess 30 and lug 56 and between the recess 32 and lug 58 due to the stiffness of the connecting printed circuit boards 22 and 24.

The bending state of the connecting printed circuit boards 22 and 24 when the keyboard 86 is swung between the operating position and folding position will now be explained. As shown in FIG. 4, when the keyboard 86 is swung in the direction of the arrow B from the operating position to the folding position, the slit 21 at the rear end of the keyboard 86 turns clockwise, and the bend sections 62 and 64 of the connecting printed circuit boards 22 and 24 are lowered such that their bent deformation is relaxed, as shown by the 2-dot and dash line, thereby allowing the keyboard 86 to have its attitude switched in the swing motion from the operating position to the folding position without any problems arising. At this time, even if the bend sections 62 and 64 have their bent state varied, the coupling between the cuts 30 and lugs 56 and between the cuts 32 and lugs 58 is retained, and the portion of the connecting printed circuit board 22 extending from the connector 44 to the auxiliary frame plate 50 is prevented from moving back and forth relative to the auxiliary frame plate 50, whereby the connecting printed circuit board 22 is prevented from having to its printed patterns damaged near the connector 44. Similarly, the portion of the connecting printed circuit board 24 extending from the connector 46 to the auxiliary frame plate 50 does not move back and forth relative to the auxiliary frame plate 50, and the connecting printed circuit board 24 is prevented from having its printed patterns damaged near the connector 46. When the keyboard 86 is swung in the direction of the arrow A from the folding position to the operating position, the bend sections 62 and 64 are bent again, and the keyboard 86 has its attitude switched without any problem arising.

As described above, the printed circuit board 20 has its signal lines 26 and 28 connected directly to the corresponding signal lines of the main controller board 38 without the intervention by any electronic component part, and the keyboard 86 can be moved by being swung between the folding position and operating position. Accordingly, the structure of the present invention eliminates the keyboard printed circuit board which contains a decoding ROM and CPU and the associated connection cable, without sacrificing the inherent functions of the word processor 82. The keybaord 86 is simplified in stucture, and the number of component parts for the keyboard 86 can be reduced drastically.

When repairing and servicing the word processor 82, the mount plate 42 is removed and the connecting printed circuit boards 22 and 24 are pressed downward, as shown by the 3-dot and dash line in FIG. 4. The coupling between the cut 30 and lug 56 and between the cut 32 and lug 58 can then be easily separated, and the main controller board 38 can be readily removed.

An alternative arrangement whereby the connecting printed circuit boards 22 and 24 exit through a portion other than the rear end of the keyboard 86 permits the connecting printed circuit boards to bend at their bending sections 62 and 64 when the keyboard 86 is in the folding position and permits bending sections 62 and 64 to relax when the keyboard 86 is in the operating position. Another arrangement involves the connecting printed circuit boards 22 and 24 being provided separately from the printed circuit board 20, with both parts being connected by connectors. Additionally, a stud member 70 made of rubber, for example, may be provided on the main body 84 so that it is in contact with the lower surface of the connecting printed circuit board 22 in the vicinity of the cut 30, so that the coupling of the cut 30 and lug 56 is not disengaged accidentally. Another stud member 72 may be provided for the coupling between the cut 32 and lug 58.

What is claimed:

1. A keyboard signal line connecting structure electrically connecting a keyboard to a host apparatus comprising:

a hinge member pivotally connecting the keyboard to a front face of the host apparatus so that the keyboard can assume a folding attitude uprightly facing the front face of the host apparatus and a virtually horizontal laid-down attitude whereby the keyboard is operable by an operator;

a key switch circuit board having a plurality of key switches arranged in a matrix in the keyboard;

a main controller board disposed inside the host apparatus, provided with electronic component parts for controlling the host apparatus; and a flexible connecting printed circuit board which is one-piece with the key switch circuit board, said flexible connecting printed circuit board connecting a number of signal lines of the key switch circuit board to corresponding signal lines of the main controller board, extending from said key switch circuit board to the main controller board, and being provided with a bend section which increases its degree of bend when the keyboard assumes one of the folding attitude and the laid-down attitude, and decreases its degree of bend when said keyboard assumes the other attitude, said bend section being located inside a space within said host apparatus and wherein a portion of said keyboard extends inside of said space of said host apparatus, said portion including a slot wherein said flexible connecting printed circuit board passes from inside said keyboard through said slot and into said space.

2. The apparatus according to claim 1, wherein said host apparatus includes inhibition means, located in said space, for inhibiting said bend section from extending toward a connect portion of said flexible connecting printed circuit board and said main controller board.

3. The apparatus according to claim 2, wherein said inhibition means includes a member located in said space and including a passage therethrough having a lug, and wherein said flexible connecting printed circuit board passes through said passage and includes a notch which engages said lug to restrict further movement of said flexible connecting printed circuit board through said passage.

4. A keyboard signal line connecting structure electrically connecting a keyboard to a host apparatus comprising:

a hinge member pivotally connecting the keyboard to a front face of the host apparatus so that the keyboard can assume a folding attitude uprightly facing the front face of the host apparatus and a virtually horizontal laid-down attitude whereby the keyboard is operable by an operator;

a key switch circuit board having a plurality of key switches arranged in a matrix in the keyboard;

a main controller board disposed inside the host apparatus, provided with electronic component parts for controlling the host apparatus;

a flexible connecting printed circuit board connecting a number of signal lines of the key switch circuit board to corresponding signal lines of the main controller board, extending from said key switch circuit board to the main controller board and being provided with a bend section which increases its degree of bend when the keyboard assumes one of the folding attitude and the laid-down attitude and decreases the degree of bend when it assumes the other attitude; and inhibition means for inhibiting the bend of the flexible connecting printed circuit board from extending to a connect portion of the flexible connecting printed circuit board and the main controller board, said inhibition means including a member having a path with a lug, the flexible connecting printed circuit board penetrating through the path, said member restricting movement of the flexible connecting printed circuit board therethrough.

5. The apparatus according to claim 4, wherein said bend section is located inside a space within said host apparatus.

6. The apparatus according to claim 5, wherein a portion of said keyboard extends inside of said space of said host apparatus, said portion including a slot wherein said flexible connecting printed circuit board passes from inside said keyboard through said slot and into said space.

7. The apparatus according to claim 4, wherein said flexible connecting printed circuit board includes a notch which engages said lug to restrict further movement of said flexible connecting printed circuit board through said passage.

8. Apparatus comprising:
a host apparatus including a frame defining a space therein, a main controller board being located in said space and being provided with electronic components;
a keyboard including a plurality of keys for inputting data, said keyboard including a key switch circuit board having a plurality of key switches arranged in a matrix and operatively attached to said keys;
a hinge member pivotally connecting said keyboard to said host apparatus so that said keyboard can assume a folding attitude uprightly facing a surface of said host apparatus and a virtually horizontal laid-down attitude whereby the keyboard is operable by an operator;
a flexible connecting printed circuit board which is one-piece with said key switch circuit board, said flexible connecting printed circuit board connecting a number of signal lines of said key switch circuit board to corresponding signal lines of said main controller board, extending from said key switch circuit board to said main controller board, and being provided with a bend section which increases is degree of bend when the keyboard assumes one of the folding attitude and the laid-down attitude, and decreases its degree of bend when said keyboard assume the other attitude, said bend section being located inside said space of said host apparatus; and
inhibition means, located in said space, for inhibiting said bend section from extending toward a connect portion of said flexible connecting printed circuit board and said main controller board, said inhibition means including a member located in said space and including a passage therethrough having a lug, and wherein said flexible connecting printed circuit board passes through said passage and includes a notch which engages said lug to restrict further movement of said flexible connecting printed circuit board through said passage.

9. The apparatus according to claim 8, wherein said apparatus is a word processing apparatus and said electronic components control said host apparatus to perform word processing functions.

10. Apparatus comprising:
a host apparatus including a frame defining a space therein, a main controller board being located in said space and being provided with electronic components;
a keyboard including a plurality of keys for inputting data, said keyboard including a key switch circuit board having a plurality of key switches arranged in a matrix and operatively attached to said keys;
a hinge member pivotally connecting said keyboard to said host apparatus so that said keyboard can assume a folding attitude uprightly facing a surface of said host apparatus and a virtually horizontal laid-down attitude whereby the keyboard is operable by an operator; and
a flexible connecting printed circuit board which is one-piece with said key switch circuit board, said flexible connecting printed circuit board connecting a number of signal lines of said key switch circuit board to corresponding signal lines of said main controller board, extending from said key switch circuit board to said main controller board, and being provided with a bend section which increases its degree of bend when the keyboard assumes one of the folding attitude and the laid-down attitude, and decreases its degree of bend when said keyboard assumes the other attitude;
wherein a portion of said keyboard extends inside of said space of said host apparatus, said portion including a slot wherein said flexible connecting printed circuit board passes from inside said keyboard through said slot and into said space.

* * * * *